United States Patent [19]

Hutson

[11] 3,857,474

[45] Dec. 31, 1974

[54] ADJUSTABLE CONTAINER CONVEYOR FOR FILLING MACHINE

[75] Inventor: George Ernest Hutson, Minneapolis, Minn.

[73] Assignee: Hercules Incorporated, Wilmington, Del.

[22] Filed: Sept. 25, 1973

[21] Appl. No.: 400,470

[52] U.S. Cl.................... 198/131, 198/162, 209/84
[51] Int. Cl............................................. B65g 15/24
[58] Field of Search ............ 198/131, 160, 162, 75; 209/83, 84

[56] References Cited
UNITED STATES PATENTS

| 1,159,208 | 11/1915 | Gill et al. | 209/84 |
| 1,725,665 | 8/1929 | Moe | 209/84 |
| 2,860,779 | 11/1958 | Lindeman et al. | 209/84 |
| 3,065,851 | 11/1962 | Arnold | 209/84 |
| 3,206,024 | 9/1965 | Blake | 209/84 |
| 3,405,801 | 10/1968 | Zwiacher et al. | 209/84 |
| 3,779,364 | 12/1973 | Kammann | 198/131 |

Primary Examiner—Evon C. Blunk
Assistant Examiner—Richard K. Thomson
Attorney, Agent, or Firm—James W. Peterson

[57] ABSTRACT

The invention is an adjustable container conveyor having first and second conveyors, said conveyors having coincident centers of rotation and having first and second generally symmetrical container supports, respectively, said conveyors being adjustable with respect to each other to accommodate varying sizes of containers by means of a conveyor adjustment and drive means having sets of helical gears that convert simple motion into two opposite angular motions to open or close the opening between the first and second container supports.

6 Claims, 3 Drawing Figures

ADJUSTABLE CONTAINER CONVEYOR FOR FILLING MACHINE

BACKGROUND OF THE INVENTION

In the food industry and more generally in the technical area of filling equipment it is highly desirable to have a container conveyor that is readily adjustable to accommodate containers of varying dimensions. It is even more desirable to have an adjustable conveyor mechanism that is rapidly adjustable. In the past the varying of container size has required adjustment of each individual container support, e.g., U.S. Pat. No. 1,242,818. Another solution of this problem is shown in U.S. Pat. No. 2,637,958 which shows two conveyors having coincident centers of rotation utilizing two sets of sprocket wheels. Such a conveyor could presumably be adjusted by rekeying or otherwise resecuring the sprocket wheels to their shaft. The instant invention provides an adjustable container conveyor that is readily adjustable by a unique conveyor adjustment and drive means utilizing pairs of helical gears of opposite hands to convert a simple linear motion into two opposite angular motions, the opposite angular motions opening and closing the opening between the container supports to permit the use of a wide range of container shapes without requiring the changing of any parts which would be time consuming and expensive.

THE OBJECTS OF THE INVENTION

It is the primary object of the instant invention to provide an adjustable container conveyor that is readily adjustable for various sizes of containers.

It is a further object of the invention to provide an adjustable container conveyor that is rapidly and precisely adjustable.

It is yet another object of the instant invention to provide an adjustable container conveyor that is adjustable when the conveyor is in operation or when the conveyor is stopped.

SUMMARY OF THE INVENTION

It is the purpose of the instant invention to provide a rapidly, easily adjustable container conveyor for various size containers. To accomplish this purpose the instant invention provides two conveyors having coincident centers of rotation and having generally symmetrical sets of container supports said conveyors and supports being adjustable with respect to each other by two sets of helical gears of opposite hands the simple linear motion of one of said sets being converted to two opposite angular motions to open or close the container supports.

DESCRIPTION OF THE PREFERRED EMBODIMENT

Figure 1:
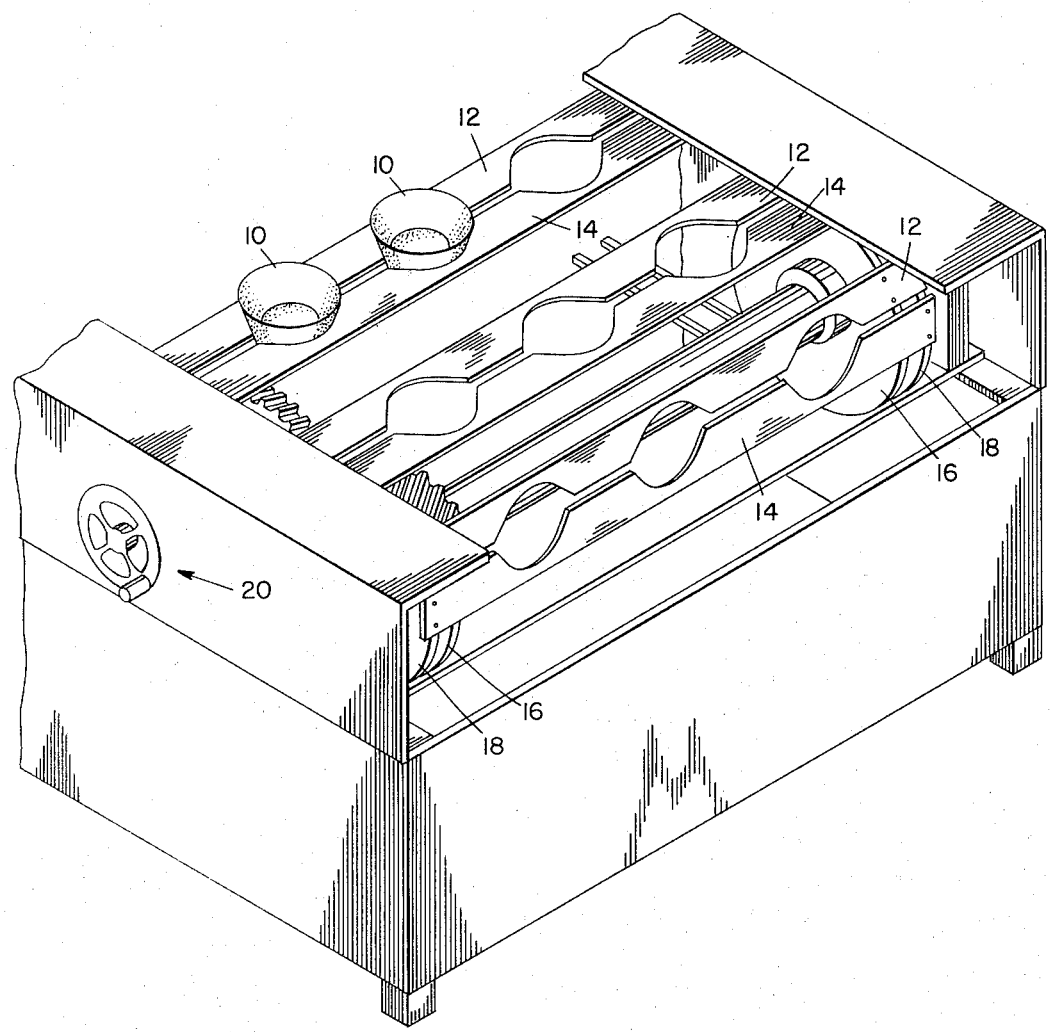
FIG. 1 is a partial perspective view of the adjustable container conveyor.

With continued reference to the drawing, FIG. 1 shows the adjustable container conveyor with representative containers 10. The containers 10 are supported by a plurality of first and second generally symmetrical container supports 12 and 14. It can be seen that movement of the generally symmetrical container supports 12 and 14 toward and away from each other will permit use of a wide range of container shapes. The container supports 12 and 14 are connected to two co-rotating conveyors 16 and 18 respectively said conveyors having coincident centers of rotation. Container supports 12 are connected to first conveyor 16 and container supports 14 are connected to second conveyor 18. Conveyors 16 and 18 are adjustable with respect to each other by a conveyor adjusting and drive means shown generally as 20.

Figure 2:
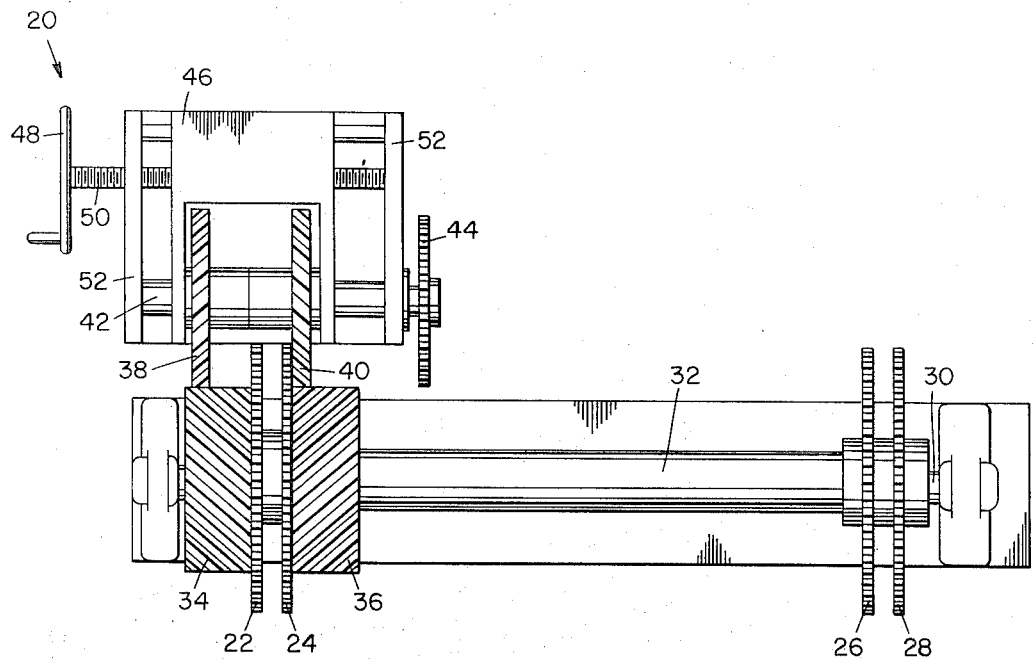
FIG. 2 is a plan view of the container adjustment and drive means.
Figure 3:
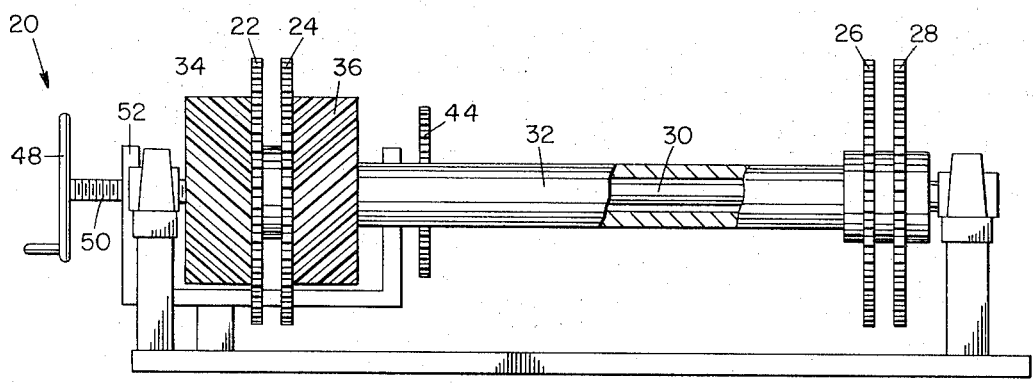
FIG. 3 is a front view of the conveyor adjustment and drive means shown in FIG. 2.

FIGS. 2 and 3 show the detailed construction of the conveyor adjustment and drive means 20. Sprocket gears 22 and 28 are connected to a common shaft 30. Sprocket gears 24 and 26 are connected by hollow shaft 32 that is concentric with shaft 30. Sprocket 22 is rigidly connected to a first helical gear 34 and sprocket gear 24 is rigidly connected to a second helical gear 36, said helical gears 34 and 36 being of the opposite hand. Thus, it can be seen that sprockets 22, 28, first helical gear 34 and shaft 30 rotate together and that sprockets 24 and 26, second helical gear 36 and shaft 32 rotate together. Helical gears 34 and 36 are in direct contact with third and fourth helical gears 38 and 40 that are of the opposite hand with respect to first and second helical gears 34 and 36. Third and fourth helical gears 38 and 40 are interconnected to spline by splined shaft 42. Splined shaft 42 must be splined or keyed to prevent angular slippage of third and fourth helical gears 38 and 40 on splined shaft 42. Drive gear 44 is connected to splined shaft 42 to drive the conveyor mechanism. It is understood that any conventional drive (not shown) such as electric or hydraulic motors may be employed to drive splined shaft 42. Third and fourth helical gears 38 and 40 can, however, slip horizontally on splined shaft 42. Yoke means 46, which is horizontally adjustable by crank 48 and threaded shaft 50, as connected to frame 52, moves third and fourth helical gears 38 and 40 horizontally on splined shaft 42. While it is shown that threaded shaft 50 moves yoke means 46 it is understood that any conventional means may be employed to move the yoke means in the horizontal direction. Thus it can be seen that by transposing third and fourth helical gears 38 and 40 of opposite hands with respect to the first and second mating helical gears 34 and 36 of opposite hands the helical gears first and second 34 and 36 will be caused to rotate in opposite directions. Since the helical gears 34 and 36 are attached to different pairs of sprocket gears and pairs of conveyor chains, the different rotational directions of the gears will open or close the opening between the container supports 12 and 14. It is important to note that said adjustment is possible independent of the motion of the conveyors. In the preferred embodiment the conveyors utilize sprocket chains and sprockets. However, frictionless belts and other known conveyors may be utilized.

The container supports 12 and 14 are shown to be generally symmetrical. It would, however, be possible to utilize a nonsymmetrical two-piece design that would likewise hold the containers between the pieces.

It is understood that the invention is not limited to the precise construction shown, but that changes are contemplated that readily fall within the spirit of the invention as shall be determined by the scope of the appended claims.

What is claimed is:

1. An adjustable container conveyor comprising:
a first conveyor having a plurality of first container supports:
a second conveyor having a coincident center of rotation with said first conveyor and having a plurality of second container supports, said first and second container supports defining an opening therebetween for holding containers;
first and second helical gears, said gears being of opposite hand, said first helical gear operatively connected to said first conveyor and said second gear operatively connected to said second conveyor; and
third and fourth rigidly interconnected helical gears, said gears being of opposite hand, said third helical gear intermeshing with said first helical gear and said fourth helical gear intermeshing with said second helical gear, said third and fourth helical gears being transversely movable with respect to said first and second helical gears and said third and fourth helical gears adapted to be rotationally driven to drive said conveyors, said transverse movement of said third and fourth helical gears rotating said first and second helical gears in opposite directions thereby adjusting the opening between said first and second container supports.

2. A conveyor as in claim 1 wherein said first and second conveyors each comprise pairs of sprocket chains, said pairs of sprocket chains interconnected by said first and second conveyor supports, respectively.

3. A conveyor as in claim 2 further including yoke means connected to said third and fourth helical gears to move said third and fourth helical gears transversely, said yoke means including a crank and threaded shaft for adjustment.

4. An adjustable conveyor comprising:
a first conveyor having a plurality of first container supports;
a second conveyor having a coincident center of rotation with said conveyor and having a plurality of second container supports, said first and second container supports defining openings therebetween for holding containers;
first and second helical gears, said gears being of opposite hand, said first helical gear operatively connected to said first conveyor and said second helical gear operatively connected to said second conveyor; and
third and fourth rigidly interconnected helical gears, said gears being of opposite hand, said third helical gear intermeshing with said first helical gear and said fourth helical gear intermeshing with said second helical gear, said third and fourth helical gears being transversely movable with respect to said first and second helical gears and said third and fourth helical gears adapted to be rotationally driven to drive said conveyors, transverse movement of said third and fourth helical gears rotating said first and second helical gears in opposite directions thereby adjusting the opening between said first and second container supports the centers of said openings remaining constant with respect to the conveyors.

5. A conveyor as in claim 4 wherein said first and second conveyors each comprise pairs of sprocket chains each of said pairs interconnected by said first and second conveyor supports, respectively.

6. A conveyor as in claim 5 further including yoke means connected to said third and fourth helical gears to move said third and fourth helical gears transversely, said yoke means including a crank and threaded shaft for adjustment.

* * * * *